United States Patent [19]
Furukawa

[11] Patent Number: 5,265,748
[45] Date of Patent: Nov. 30, 1993

[54] MULTI-PURPOSE CONTAINER

[76] Inventor: Shigenobu Furukawa, 7-10, Tsuboi 3-chome, Ondo-cho, Aki-gun, Hiroshima, 737-12, Japan

[21] Appl. No.: 830,752

[22] Filed: Feb. 6, 1992

Related U.S. Application Data

[63] Continuation of Ser. No. 746,809, Aug. 13, 1991, abandoned, which is a continuation of Ser. No. 556,852, Jul. 24, 1990, abandoned, which is a continuation of Ser. No. 280,508, Dec. 6, 1988, abandoned.

[30] Foreign Application Priority Data

Dec. 10, 1987 [JP] Japan ............................. 62-313059

[51] Int. Cl.⁵ ............................................. B65D 87/00
[52] U.S. Cl. ........................................ 220/1.5; 410/29
[58] Field of Search .................... 220/1.5, 692; 410/4, 410/6, 29, 29.1

[56] References Cited

U.S. PATENT DOCUMENTS

| | | | |
|---|---|---|---|
| 3,456,830 | 7/1969 | Golder | 220/1.5 |
| 4,506,798 | 3/1985 | Goutille | 220/1.5 |
| 4,786,222 | 11/1988 | Blodgett | 410/29 |

FOREIGN PATENT DOCUMENTS

| | | | |
|---|---|---|---|
| 476622 | 12/1968 | Switzerland | 220/1.5 |
| 1218235 | 1/1971 | United Kingdom | 220/1.5 |
| 1354674 | 5/1974 | United Kingdom | 220/1.5 |
| 1580706 | 12/1980 | United Kingdom | 220/1.5 |

Primary Examiner—Steven M. Pollard
Attorney, Agent, or Firm—Beveridge, DeGrandi & Weilacher

[57] ABSTRACT

A multi-purpose container which is constructed by easily assemblying standing main frame members, a bottom frame member, standing side frame members and a roof frame member. The multi-purpose container is easily disassembled, to small size, for recovery. The multi-purpose container further includes door members attached to the side frame members to thereby load and unload a variety of cargo.

12 Claims, 16 Drawing Sheets

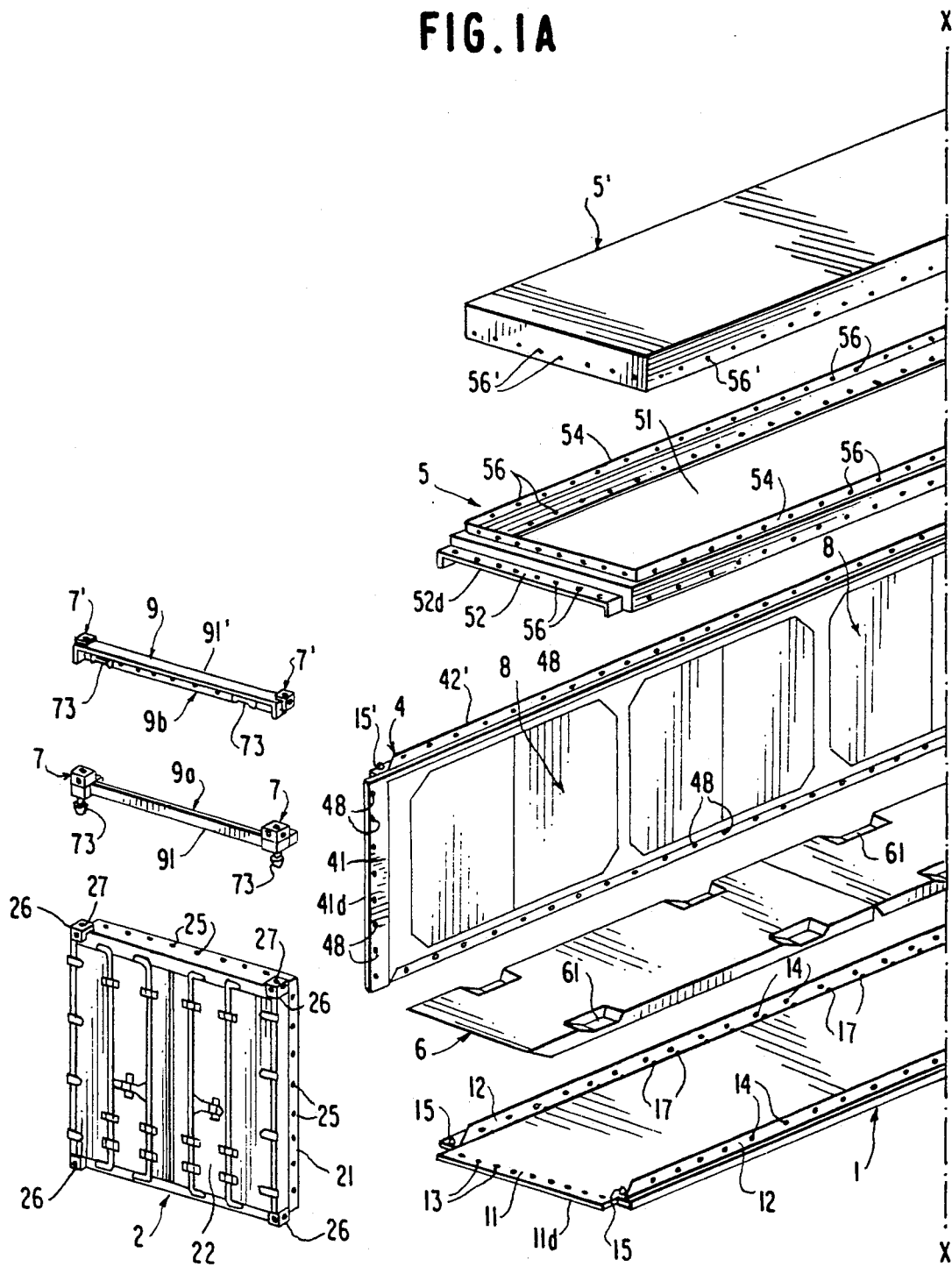

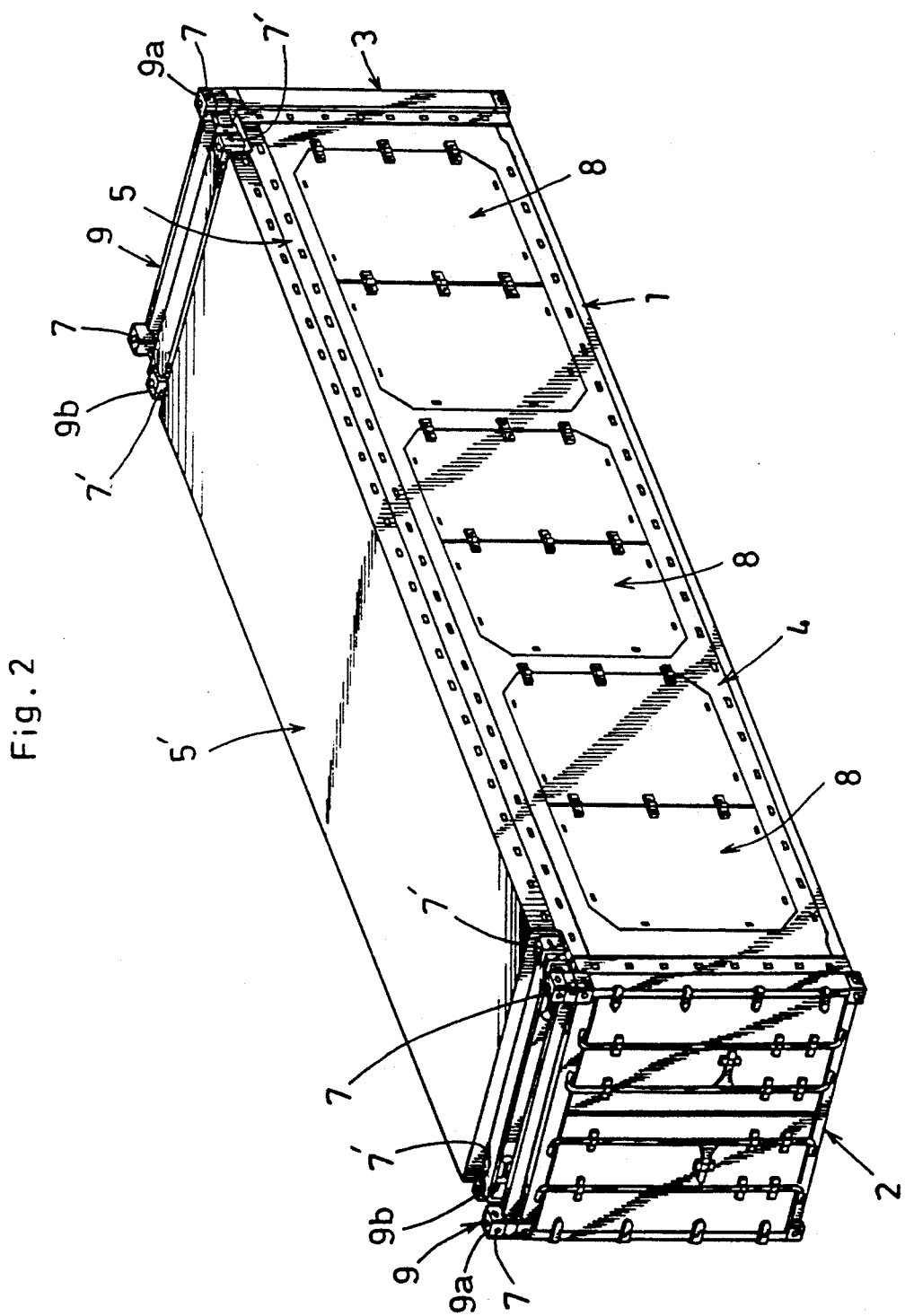

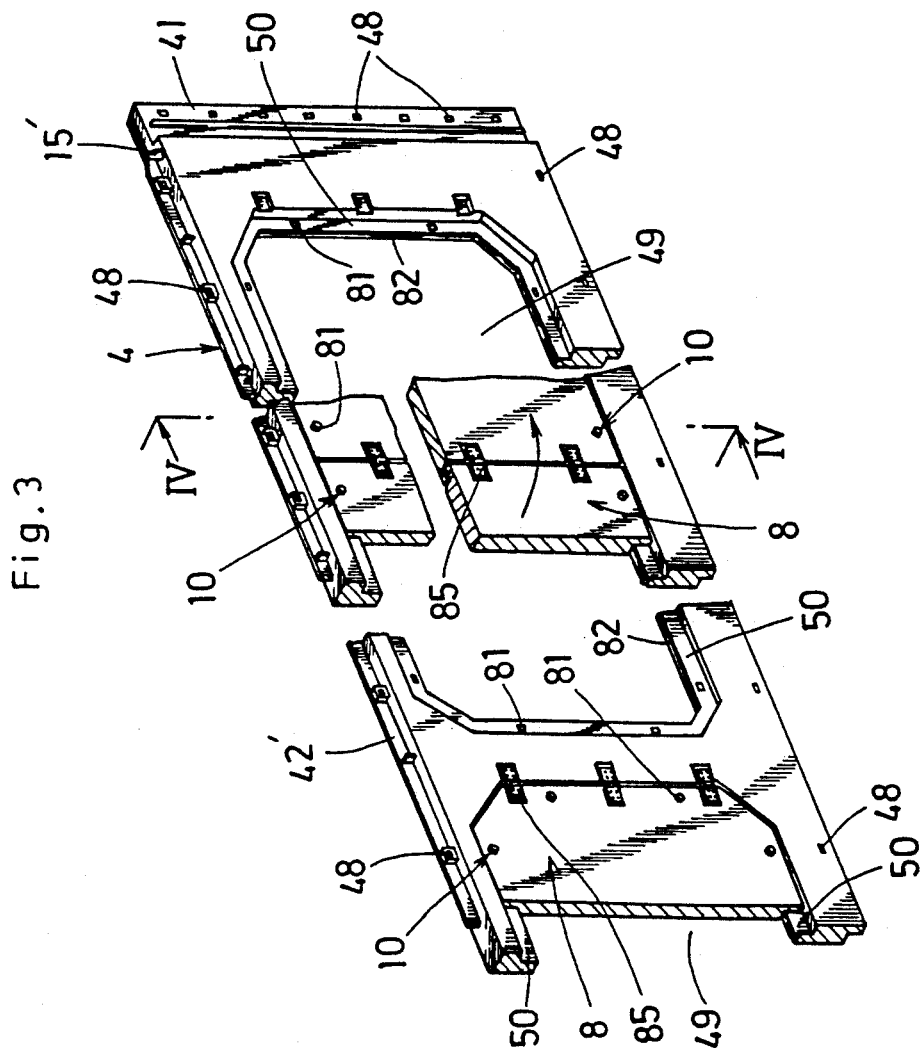

Fig. 4
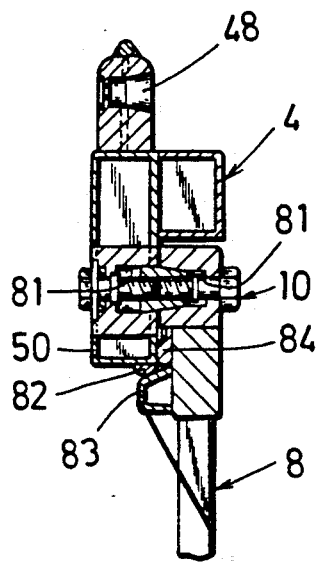
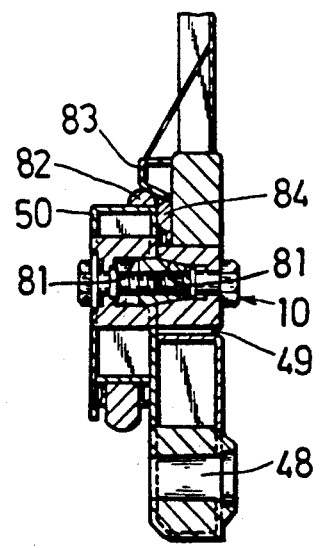

MULTI-PURPOSE CONTAINER

This application is a continuation of application Ser. No. 07/746,809 filed Aug. 13, 1991, now abandoned, which is a continuation of application Ser. No. 07/556,852 filed on Jul. 24, 1990 (abandoned), which is a continuation of application Ser. No. 07/280,508 filed on Dec. 6, 1988 (abandoned).

BACKGROUND OF THE INVENTION

1. Field of the Invention

This invention relates to a multi-purpose container in which various cargoes are loaded, being bulked small when no cargo is housed.

2. Description of the Related Art

Conventionally, various containers corresponding to a variety of cargo are supplied, thereby to reliably protect cargoes during transportation on land or sea.

Containers in which a limited sort of cargoes are housed, for example a refrigerating container, a tank container, a container only for animals etc., are constructed most suitably to the housing cargoes. So remarkable difficulty during loading operation does not recognized.

A popular dry-container houses general merchandises mainly, but the sort of the housing cargoes is not limited.

Loading of the cargoes is achieved by using fork-lift car etc. through an opened door of the container. So the loading operation is not suitable for a long sized cargo, a bulk cargo for its weight (especially a bulk cargo in a length direction of the container) etc.

Accordingly, open-top containers provide a detachable top member, the top surface of which is covered by a canvas cover to protect it from intruding water, or flat-rack containers provided with four pillars standing at four corners, because the cargoes for example glass plates, plant products, bulk bulldozers, iron materials, may be housed in the container by using a crane.

At the arrival place, an unloading operation using cranes similarly to the departure place is carried out, thereby to load or unload cargoes to or from the container is troublesome occasionally.

In the case that cargoes are hot coils, a plurality of hot coils should be loaded in good order by fixing them in turns carried into the container through the door of the main frame member at the predetermined position using wedges and applying lashing. Then the efficiency of loading operation goes down and the accuracy of fixed position of the hot coils goes down. As a result, deformation and/or damage of hot coils will happen because of various forces acting on the hot coils during transportation, in spite of loading hot coils in the container with spending a great deal of labor and time. Accordingly, this loading system of hot coils is not put to practical use.

In the transportation using the container, the frequency of transporting empty containers is nearly the same as the frequency of transporting filled containers, so the space occupied by the empty container is the same as the space occupied by the filled container, thereby to decrease the utilizing efficiency of ships, trucks, freight trains and accumulating place for empty containers.

More specifically, the containers are mainly 20 feet in length and 40 feet in length, each size fall under the ISO standard.

Each total weight is arranged 20 tons and 30 tons respectively, and the maximum height is arranged 8 feet 6 inches to conform to the Road Traffic Control Law and Aft traffic control for example the height of tunnels. The standard container is examining to change the total weight and the maximum height of the 20 feet sized container to 24 tons and 9 feet 6 inches respectively.

These containers are constructed in not permitting disassemblance because enough strength and protection from water are needed considering transportation on sea in the piled condition, thereby to occupy the same space regardless of whether empty or full. Accordingly, the same space as the space of the ships, trucks, freight trains when transporting the cargoes, is needed when transporting the empty containers, thereby to increase the energy waste rate per the volume of transporting cargoes.

This disadvantage will be remarkable when the standard of container is improved as aforementioned.

SUMMARY OF THE INVENTION

It is an object of the present invention to produce a novel multi-purpose container.

It is another object of the present invention to load and unload variable cargoes easily.

It is a further object of the present invention to increase the space efficiency for loading automobiles into the multi-purpose container.

It is still another object of the present invention to decrease the space needed for transporting the container in which no cargo is loaded.

It is a still further object of the present invention to protect cargoes housed in the container from being stolen.

In order to achieve the objects above-mentioned, the multi-purpose container in accordance with the present invention, being assembled to be a cube, comprises:

quadrilateral main frame members, a rectangular bottom frame member, side frame members, a roof frame member, holes formed at the connecting portion of each members, connecting members inserted in said hole in extractable manner, two pairs of holding members for holding said members piled, being possible to be fixed to corner metal fittings provided at the top portion of said main frame members, each pair of holding members being possible to be connected one another, a plurality of openings having inner flange, formed at the predetermined position of said side frame members, and foldable door members attached to said openings in an openable manner.

Preferably, the roof frame member comprises an edge member substantially formed as a square frame and a quadrilateral cover attached to the edge member in a disattachable manner, to cover the top opening of the edge member.

Preferably, the opening is shaped as an eight cornered polygon, the eight cornered polygon is formed by cutting away four corners of rectangle elongated in the length direction of the container.

Preferably, the inner flange is fixed at the edge portion of the opening as one body, and an arc-shaped projection in the sectional figure is formed at the top of the edge portion of the inner flange.

Preferably in these cases, the door member is housed to the step formed by the inner flange, is connected to the side frame member and rotatable only in an outward direction, and is also foldable in the outward direction.

More preferably, holes communicating with each other are formed at the edge portion of the door member and the inner flange, and screw wedges extractable from only inside of the container are inserted in the holes.

Preferably, a connecting member holding member united sealing member is further housed in each hole.

Preferably, a step is further formed at the edge portion of the members, thereby to ensure the connection of neighboring members, more preferably in this case, a sealing member is further fixed to the step.

Preferably, the connecting portion of the bottom frame member with the side frame member is a guiding projection united fitting member of the side frame member, and the connecting portion of the side frame member with the roof frame member is a guiding projection united fitting member of the roof frame member.

More preferably, upward projections are formed at the longer side of the bottom frame member, and fixing members for lashing are fixed at the predetermined position of the upward projections.

Preferably, each pair of holding members comprises a holding member attached to the corner metal fittings of the main frame member in a detachable manner, and a holding member attached to the holding member in a detachable manner, and connecting members are housed in one holding member, more preferably in this case, each pair of holding members is attached to the main frame member to suit the top surface of the roof frame member.

According to the multi-purpose container having the arrangement above-mentioned, the main frame members, the bottom frame member, the side frame members and the roof frame member are assembled to form the cubic multi-purpose container satisfying the strength established with the ISO standard, by inserting the connecting members into the holes. Loading or unloading cargoes is achieved after assembling the members. On the contrary, assembling the members is achieved after loading cargoes on the bottom member. Each pair of holding members are attached to the corner metal fittings provided at the top portion of the main frame members by the connecting members, and each pair of holding members are connected as one body by the connecting members.

Intensity of the container seems to be lowered because of forming a plurality of openings at the side frame members. But the intensity of the container is nearly same as the intensity of the conventional container under the ISO standard, when the door members are closed to contact to the inner flanges. On the contrary, the intensity is lowered when the door members are opened. The door members are opened only when loading or unloading of cargoes are achieved, and the container cargoes are loading or unloading therein or therefrom, is not piled, thereby inconvenience does not occur.

The multi-purpose container thus assembled must satisfy requisites for protecting from extracting inner cargo from outside after performing a seal-lock at the lock portion of the door, and for confirming all connecting members from outside, thereby to transport cargoes securely and certainly.

When recovering the multi-purpose container, detach two pairs of holding members from the main frame member at first, disconnect each members by pulling out all connecting members second, then pile up each member in the state that the main frame members are positioned at the intermediate position as sandwiched by the other members, thereby to decrease the bulk in its entirety. After that, the edge portion of the top piled member and the edge portion of the bottom piled member are held by each holding member of each pair of holding members respectively, then both holding members are moved apart to the permitted limit of the connecting member, maintaining the connected state of both holding members, thereby to get together comprising member of the multi-purpose container. The volume thus is decreased to the one several-th of the volume of the assembled multi-purpose container.

Further objects and advantages of this present invention will become apparent as the following description proceeds and the features of novelty which characterize this present invention are pointed out particularly in the claims annexed hereto.

BRIEF DESCRIPTION OF THE DRAWINGS

FIG. 2 is a perspective view of a multi-purpose container in the assembled state, FIG. 3 is a partially cutaway perspective view showing the attached state of the door member to the side frame member, FIG. 4 is an enlarged section view taken along the line IV—IV in FIG. 3.

DESCRIPTION OF THE PREFERRED EMBODIMENT

Figure 1B:
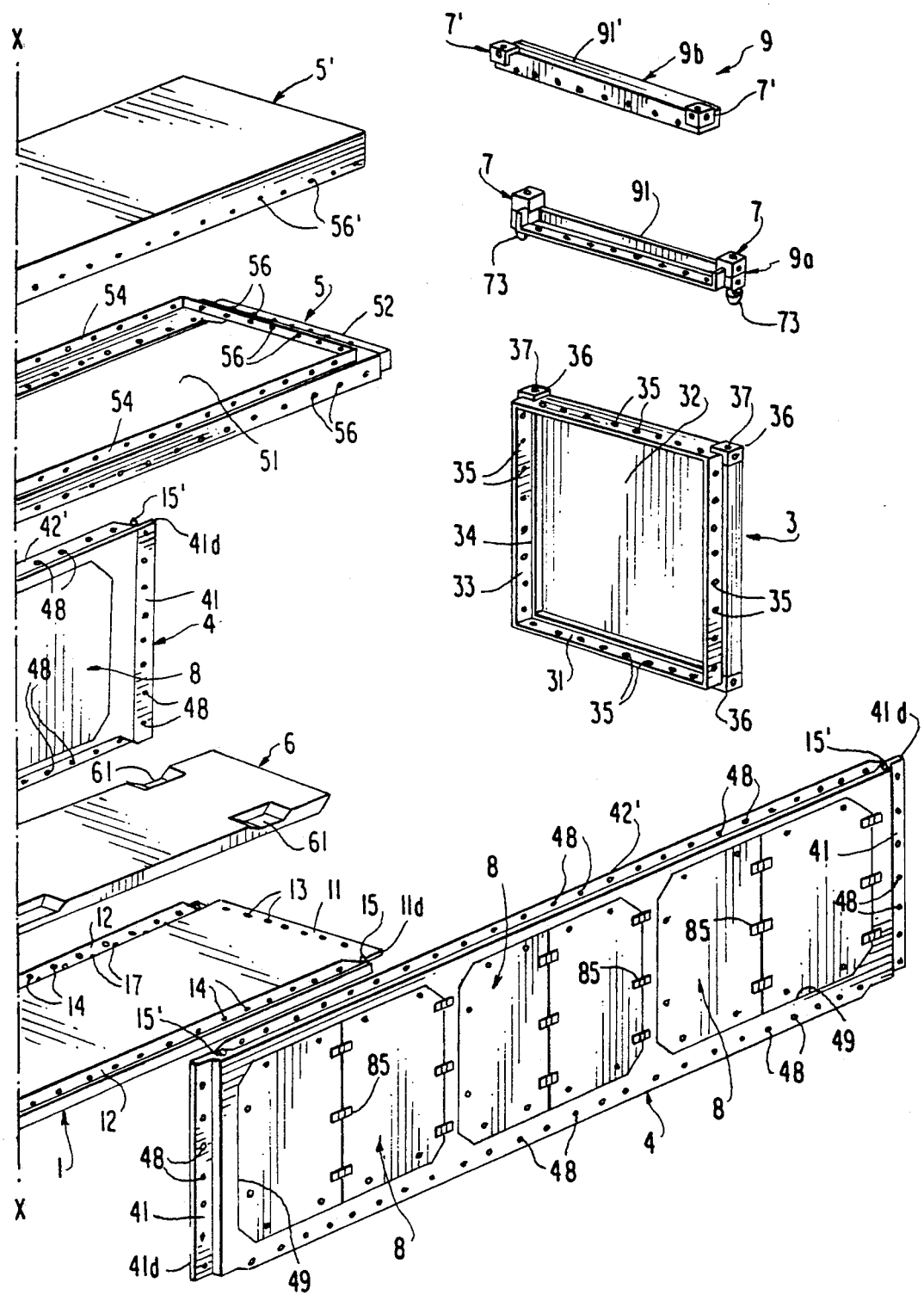
FIG. 1 is an exploded perspective view of a multi-purpose container in accordance with an embodiment of the present invention.

FIG. 1 is an exploded perspective view of a dry container which is an instance of the multi-purpose container in accordance with the present invention, while FIG. 2 is a perspective view thereof showing the assembled state.

In FIGS. 1 and 2, the dry container has a bottom frame member 1, a front main frame member 2, a rear main frame member 3, a pair of side frame members 4, a roof frame member 5, a roof cover 5', an inner shelf member 6 and two pairs of holding members 9.

Now referring to FIGS. 3, 4, 5, 6 and 7, the multi-purpose container is described in detail.

The bottom frame member 1 is a rigid plate whose width is 8 feet and length is about 40 feet. Each short edge of the bottom frame member 1 is shaped as a first connecting projection 11 in the shape of somewhat narrow width and cut out at its bottom side (see FIG. 5). Each long edge of the bottom frame member 1 is projected upward, and a guiding projection 12 having a predetermined height is shaped at the top edge of the long edge (see FIG. 6). Tapered holes 13 and 14 are formed at the first connecting projection 11 and the guiding projection 12 at every predetermined interval respectively. A downward projection 16 is formed at the predetermined position of the bottom surface of the first connecting projection 11, thereby to ensure touch with the main frame member. A projection 15 for fixing position is formed adjacent to the guiding projection 12. Fixing members 17 for lashing are fixing at the predetermined position of the guiding projection 12.

The side frame member 4 is a rigid plate whose width is 8 feet 6 inches and length is 40 feet. Each short edge of the side frame member 4 is shaped as a second connecting projection 41 in the shape of somewhat narrow width and cut out at its outer side (see FIG. 1). A guiding groove 42 is formed at the bottom surface of the downward edge of the side frame member 4, thereby to engage the guiding projection 12. A guiding projection 42' is shaped at the upward long edge of the side frame member 4, thereby to engage guiding grooves 53 formed at the bottom surface of the roof frame member 5. A sealing member 46 is housed interior of the guiding groove 42. A skirt member 47 is projected downward from the outer surface of the portion having the guiding groove 42, thereby to touch with the side face of the bottom frame member 1. Tapered holes 48 are formed at the portion having the guiding groove 42, thereby to communicate with the tapered holes 14 formed at the guiding projection 12. Tapered holes 48 are also formed at the guiding projection 42'. Tapered holes 48 are also formed at the second projection 41, thereby to communicate with tapered holes 25 of the main frame member described later. Holes engagable with the projections 15 (not shown) and a projection 15' to fix the position of the roof frame member 5 are formed at the predetermined position of the side frame member 4.

Three eight-cornered-polygon shaped openings 49 are formed at the predetermined position, distances therebetween are equal, and openable door members 8 are to the openings 49. As shown, openings 49 have heights which are less than that of their side frame members 4.

Now referring to FIGS. 3 and 4, the opening 49 and the door member 8 are described in detail.

An inner flange 50 is fixed in one body to the inside of the frame member 4, corresponding to the opening 49, thereby to form a step for housing the door member 8. Tapered holes 81 communicated each other are formed at the predetermined position of the inner flange 50 and the door member 8. A contacting portion 82 is formed at the projected edge of the inner flange 50. A tapered contacting portion 83 being able to contact with the contacting portion 82 is formed to the inner side of the door member 8. A sealing member 84 being able to contact with the inner flange 50 is attached next to the tapered contacting portion 83.

One vertical edge of the door member 8 is rotatably connected to the side frame member 4 by hinge members 85. The door member 8 is divided into two plates at its center, and the divided plates are connected to each other foldably in an outward direction by hinge members 85. Contacting portions of the divided plates are step shaped, each step is formed as the inverse shape of the other. The hinge members 85 are buried in the door member 8 and the side frame member 4.

The roof frame member 5 is a rigid plate whose width is 8 feet and length is about 40 feet. A large opening 51 is formed at the center of the rigid plate. The roof cover 5' is attached to the strong plate to cover the large opening 51 in a detachable manner. Each short edge of the roof frame member 5 is shaped as a third connecting projection 52 in the shape with a somewhat narrow width and cut out at its top side (see FIG. 1). The height of the roof cover 5' is equal to the height of holding members 9 described later. In more detail, guiding grooves 53 are formed at the bottom surface of the roof frame member 5, thereby to engage with the guiding grooves 42'. A guiding projection 54 is shaped at the top surface of the roof frame member 5, thereby to engage with the top cover 5'. A sealing member 55 is housed interior of the guiding groove 53. Tapered holes 56 are formed at the portion having the guiding groove 53, thereby to communicate with the tapered holes 48 formed at the guiding projection 42'. Tapered holes 56 are also formed at the third connecting projection 52, thereby to communicate with tapered holes formed at the main frame member described later. Skirt members 57 are projected downward from the long edge of the roof frame member 5, thereby to touch with the side face of each side frame member 4.

A guiding groove 54' to engage the guiding projection 54 is formed at the side bottom surface of the roof cover 5'. A sealing member 55' is housed interior of the guiding groove 54'. Tapered holes 56' are formed at the portion having the guiding groove 54', thereby to communicate with the tapered holes 56 formed at the guiding projection 54.

The front main frame member 2 comprises a square frame 21 having a sleeve-like structure extending therefrom and a double door 22. The sleeve-like portion of the square frame 21 is to be, in touch with the outer surface of the connecting projections 11, 41 and 52 shaped at the short edge of the bottom frame member 1, a pair of the side frame members 4 and the roof frame member 5. The double door 22 is fixed to the square frame 21. The rear inner portion of the square frame 21 is cut out to form a step 23. The step 23 is the tapered shape. Sealing member 24 is fixed to the step 23 against engaging portions 11d, 41d and 52d fixed to the projecting surface of the connecting projections 11, 41 and 52. Tapered holes 25 are formed at the square frame 21 to communicate with tapered holes 13, 48 and 56. Corner metal fittings 26 each having engaging holes, are fixed to the corner of the square frame 21.

The rear main frame member 3 is different from the front main frame member 2, that is a shut plate 32 is fixed to the square frame 31 instead of the double door 22.

The inner shelf member 6 is a rigid plate having the predetermined width. The predetermined length adjacent to the front main frame member 2 is cut off and connected to the rest in a rotatable up and down manner. When it is rotated downward, loading and unloading of automobiles by driving the vary automobiles are permitted. On the contrary, when it is rotated upward, loaded automobiles are kept horizontally.

Figure 5:
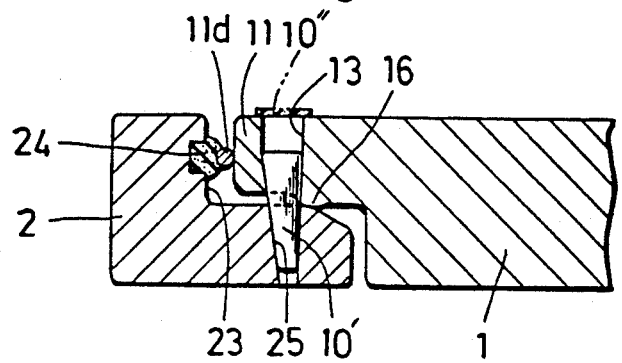
FIG. 5 is a vertical section view showing the connecting portion of the front main frame member and the bottom frame member.
Figure 6:
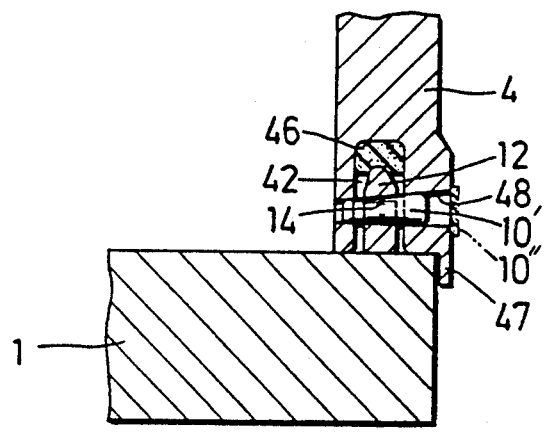
FIG. 6 is a vertical section view showing the connecting portion of the bottom frame member and the side frame member.
Figure 7:
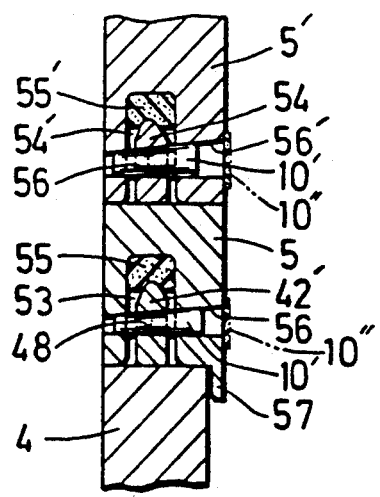
FIG. 7 is a vertical section view showing the connecting portion of the roof frame member and the side frame member.
Figure 8:
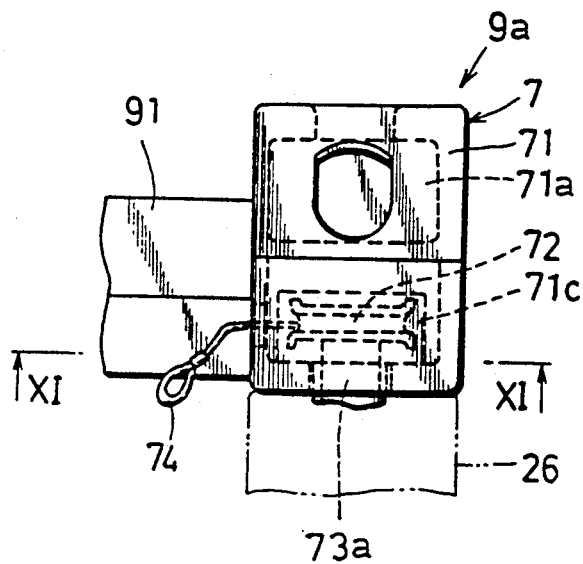
FIG. 8 is a side view showing the main portion of the holding member.
Figure 9:
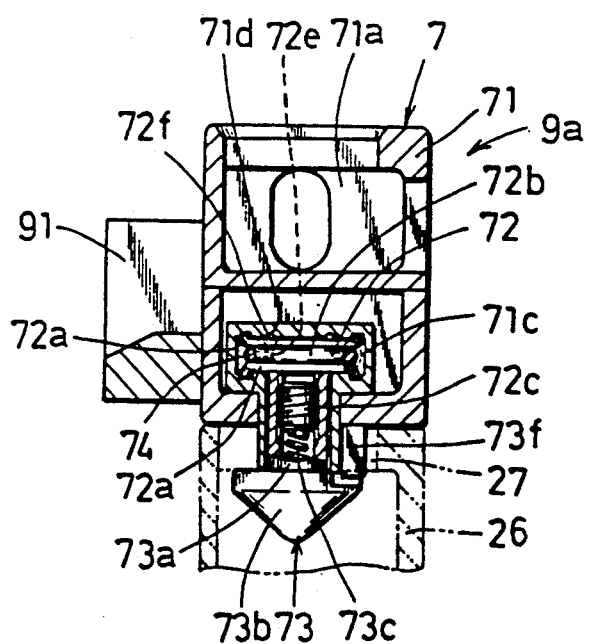
FIG. 9 is a vertical section view showing the main portion of the holding member.
Figure 10:
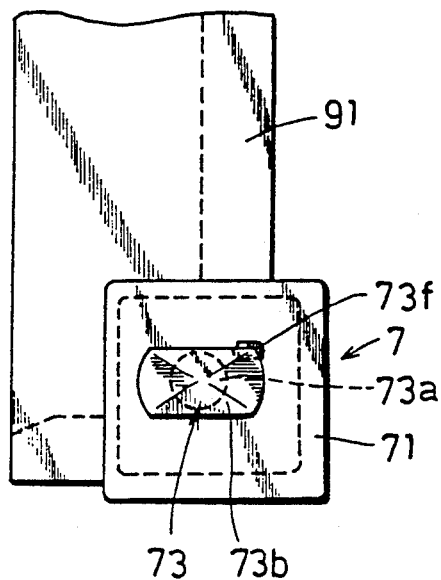
FIG. 10 is a bottom view showing the main portion of the holding member in the connected state.
Figure 11:
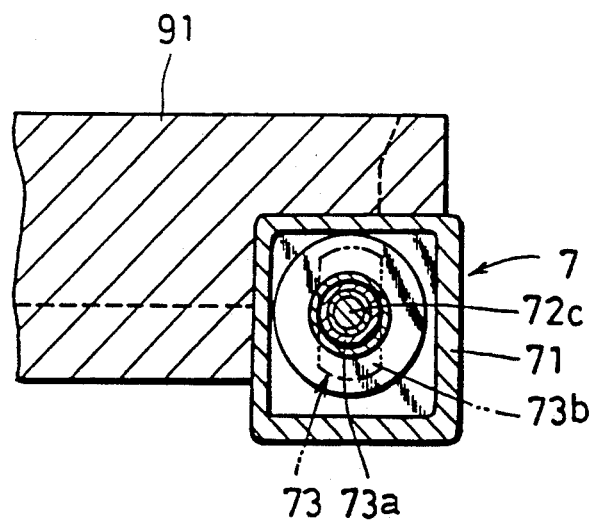
FIG. 11 is a horizontal section view taken along the line XI—XI in FIG. 8.

The inner shelf member 6 is housed in the assembled container in a detachable manner, and is supported by a driving device driven by pressured oil and guiding member 62, thereby to move up and down. Dents 61 to receive wheels of automobiles loaded in the upper chamber, are formed the inner shelf member 6 at a shifted position with respect to the roof of automobiles loaded in the down chamber. The dent 61 is formed at the predetermined depth to prevent touching the bottom surface of the automobile body with the inner shelf member 6. Wedges 10' are inserted to the communicated tapered holes as shown in FIGS. 5, 6 and 7.

The pair of holding members 9 comprises a first holding member 9a attached to the main frame member 2 and 3, and a second holding member 9b attached to the first holding member 9a. The first holding member 9a comprises a cubic frame ga to house the short edge of the bottom frame member 1 and connecting members 7 fixed to both ends of the cubic frame 91. A main locking member 73 is fixed to the predetermined position of the connecting member 7, thereby to connect with the corner metal fitting 26. A lock system including the main locking member 73 may be attached to the connecting member 7 in a detachable manner.

The second holding member 9b comprises a cubic frame 91' to house the short edge of the roof frame member 5 and connecting members 7' fixed to both ends of the cubic frame 91'. The second holding member 9b is held on the roof frame member 5 by guiding pieces (not shown) attached to the roof frame member 5 in a detachable manner, being parallel to the first holding member 9a.

Both connecting members 7 and 7' have nearly the same construction as one another. More specifically, the connecting member 7 comprises a casing 71, a rotating member 72 housed in the casing rotatably, the main locking member 73 rotating and going in and out to follow the rotation of the rotating member 72 and a driving wire 74 to rotate the rotating member 72.

The casing 71 has formed a space 71a corresponding to a corner metal fitting nearly equal in shape to the corner metal fitting 26 of the front main frame member 2 and a space 71c to house the rotating member 72 rotatably, in the interior thereof.

The rotating member 72 comprises a disc plate 72a forming a groove 72b for winding the driving wire 74 at the outer surface and a screw shaft 72c projected at the center of the disc plate 72a.

Click stop balls 72f energized upwardly by springs 72e, are housed in holes formed at the bottom edge ward position of the disc plate 72a.

Engaging dents 71d are formed at the predetermined position of the space 71c, thereby to control the rotating position of the disc plate 72a by engaging the click stop balls 72f with the engaging dents 71d.

The main locking member 73 comprises a screw pipe 73a engaged with the screw shaft 72c, an engaging head 73b engagable with the corner metal fitting 26 and a spring 73c housed in the screw pipe 73a, in the compressed condition. The engaging head 73b is formed rectanglar figure in plan view and the top surface thereof is projected as the equilateral triangle. An engaging projection 73f is formed at the predetermined position of the outer surface of the casing 71, thereby to limit the rotation of the main locking member 73 by engaging the engaging head 73b with the engaging projection 73f.

The main locking member 73 is moved to and from the corner metal fitting 26 following the movement of the pair of holding members 9. The main locking member 73 is also rotated following the rotation of the rotating member 72 by the effect of the spring 73c, within the regulated limit by the engaging projection 73f. The regulated limit is about 90 degrees. The main locking member 73 is allowed to rotate over the regulated limit, thereby to move to and from according to the relative rotation of the screw shaft 72c and the screw pipe 73a. That is, after the engaging head 73b is engaged with the engaging projection 73f, the rotating member 72 is rotated in one direction with keeping the engaged condition, thereby to move the main locking member 73 to the casing 71 against the energizing force of the spring 73c. On the contrary, the rotating member 72 is rotated in the opposite direction with keeping the engaged condition, thereby to move the main locking member 73 from the casing 71 utilizing the energizing force of the spring 73c. Accordingly, the engaging head 73b regulates the rotation by the engaging projection 73f, thereby to achieve engagement and disengagement to the corner metal fitting 26 easily.

The connecting member 7' has the construction nearly same to the connecting member 7, except the following points. The first different point is that the length of the main locking member is different. The second different point is that the rotating member and the main looking member are housed at the folded condition, in the second holding member 91'. Brackets (not shown) and set pins (not shown) are detachably attached to the folding portion.

Accordingly, after engaging the main locking members 73 of the connecting members 7 with the connecting members 7', the distance between both holding members 9a and 9b are enlarged, thereby to form the space for housing disassembled members.

Figure 12:
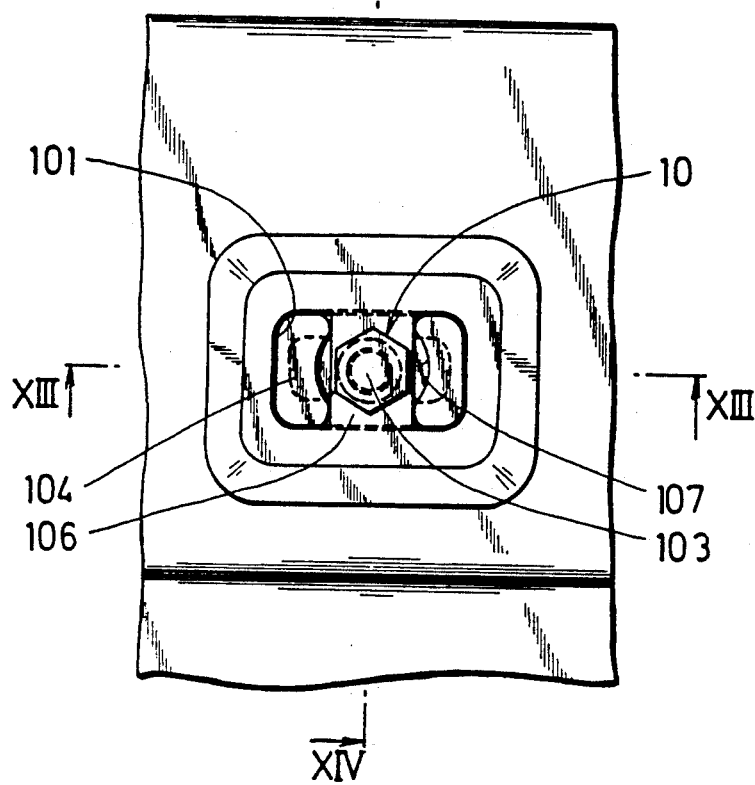
FIG. 12 is a front view of a screw-wedge.
Figure 13:
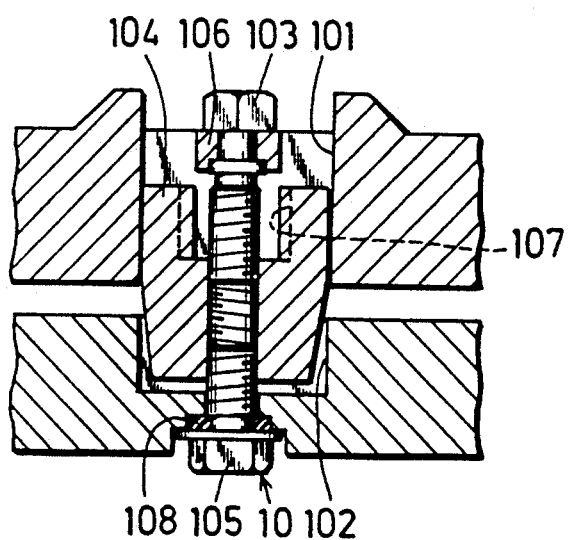
FIG. 13 is a section view taken along the line XIII—XIII in FIG. 12.
Figure 14:
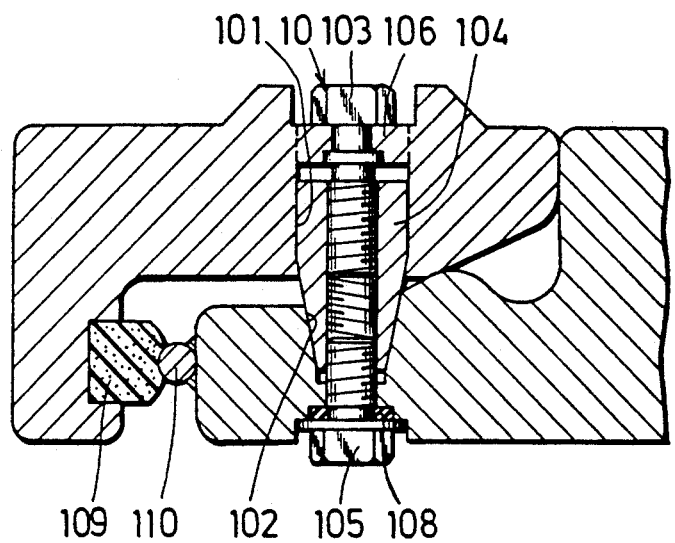
FIG. 14 is a section view taken along the line XIV—XIV in FIG. 12.

FIGS. 12, 13 and 14 illustrate the configuration of a wedge 10 screwed into tapered holes.

Wedge inserting holes 101 and 102 which communicated with each other are formed at the predetermined position of one frame member and another frame member. A screw bolt 103 and a screw wedge 104 are housed in the wedge inserting hole 101, and a back-stop screw bolt 105 is housed in the wedge inserting hole 102.

The wedge inserting hole 101 has a tapered portion only at the position adjacent to the wedge inserting hole 102, and the wedge inserting hole 102 is formed tapered covering its total length. The screw bolt 103 is attached only rotatably to a rod-shaped holding member 106 fixed to the predetermined position of the wedge inserting hole 101. The screw wedge 104 is formed in cylindrical shape nearly the same as the wedge inserting hole 101, at its base portion, and is formed in tapered cylindrical shape nearly the same as the wedge inserting hole 102, at its top portion. A groove 107 engageable with the rod-shaped holding member 106 is formed at the base portion of the screw wedge 104. The wedge inserting hole 102 is an anti-penetratable hole. A screwed hole for allowing screwed movement in/out of the back-stop screw bolt 105, is formed interior of the wedge inserting hole 102. The back-stop screw bolt 105 is allowed screwed engagement with the top portion of the screw wedge 104, by screwing the back-stop screw bolt 105 in the screwed hole at the condition that a sealing member 108 is interposed therebetween. The wedge inserting holes 101 and 102 and the screw wedges 104 are elongated in one direction, thereby to ensure the movement in/out of the screw wedge 104. A sealing member 109 is fixed to one frame member. An engaging projection 110 contacted to the sealing member 109 is fixed to another frame member.

After both wedge inserting holes 101 and 102 communicated with each other by fixing the position of both frame members accurately, the screw bolt 103 is rotated in one direction, then the screw wedge 104 is slided toward the wedge inserting hole 102 of another frame member, thereby to engage the top portion of the screw wedge 14 with the wedge inserting hole 102, because the rotation of the screw wedge 104 is inhibited. Then the back-stop screw bolt 105 engages with the top portion of the screw wedge and press the sealing member 108 strongly, by screwing the back-stop screw bolt 105 in through the screwed hole, thereby to connect both frame members as one body and to prevent water etc. from intruding.

The multi-purpose container is assembled by connecting frame members with each other using the connecting members mentioned above. After sealing the door members 8, 22 of the multi-purpose container housing cargoes therein, the rotation of the screw bolt 103 and the movement in/out of the screw wedge 104 by operating the screw bolt 103 from outside of the container are impossible, because the top portion of the rotation inhibited screw wedge 104 is screwed with the back-stop screw bolt 105, thereby to prevent cargoes from being taken out by disassembling the multi-purpose container. Accordingly, cargoes are allowed to unload only when the door members 8, 22 are opened after unsealed the door members 8, 22.

Assembling operation of the multi-purpose container above-mentioned is as follows:

At first, the side frame members 4 are connected with the bottom frame member 1 by engaging the guiding grooves 42 formed at the bottom surface of the side frame members 4 with the guiding projections 12 shaped at the top surface of the bottom frame member 1, and inserting wedges 10' into the communicated holes 48 and 14 (see FIG. 6). At this state, the top edge of the guiding projection 12 is contacted hardly to the sealing member 46 housed interior of the guiding groove 42, and the skirt member 47 is contacted to the side face of the bottom frame member 1. As a result, enter of wind and water is securely prevented, and increasing the pressing force to extremely high is securely prevented, thereby to prevent damage of the sealing member 46.

The door member 8 is prevented from opening only when an opening operation is applied from the outside of the multi-purpose container, because wedges 10 are screwed in the tapered holes 81 of the inner flange 50 and the door member 8.

The guide grooves 53 are engaged with the guide projections 42' shaped at the top edge of the side frame members 4, and the wedges 10' are inserted into the communicated tapered holes 48 and 45 thereby to maintain the predetermined distance between the top edges of the side frame members 4. Then the cubic pipe like container body portion is formed with a sleeve-like structure formed at its longitudinal ends by connection projections 11, 41, and 52. As to this engaging portion, the sealing members 55 housed interior of the guiding grooves 53 and the skirt members 57 contacted to the outer surface of the side frame members 4, cooperate to prevent wind and water from entering and to prevent contacting pressure from increasing for diminishing the damage of the sealing members 55, similarly to the above-mentioned engaging portion. Then the inner shelf member 6 is attached at the predetermined position of the container body portion. The short edge side portion of the inner shelf member 6 adjacent to the front main frame member 2, is rotated downward to form a slope way, if necessary. After that, the square frame 21 of the front main frame member 2 is attached to contact each outside of the first connecting projection 11 of the bottom frame member 1, the second connecting projection 41 of the side frame member 4 and the third connecting projection 52 of the roof frame member 5, then the wedges 10' are inserted into the communicated tapered holes 25 and tapered holes 13, 48 and 56 (see FIG. 5), thereby to connect the front main frame member 2 with the bottom frame member 1, the side frame members 4 and the roof frame member. More particularly, the engagement of the sleeve-like structure of the square frame 21 with the bottom frame member 1, the side frame members 4 and the roof frame member 5 is achieved by engaging steps. As to this engaging portion, the first connecting projection 11 engages with the tapered inner surface of the square frame 21, the edge surfaces and the cutaway steps of the bottom frame member 1, side frame members 4 and roof frame member 4 are contacted with pressure respectively, with the square frame 21, thereby to diminish the damage of the sealing member 24, and to prevent wind and water from intruding. The rear main frame member 3 is also attached to the bottom frame member 1, side frame members 4 and roof frame member 5 in the same manner as the front main frame member 2, thereby to prevent wind and water from intruding. The first holding members 9a are fixed to each main frame members 2, 3 by holding and fixing the connecting members 7 to the corner metal fittings 26 of each main frame members 2 and 3, the holding and fixing are achieved by inserting the main locking members 73 into the corner metal fittings 26 and rotating the rotating members 72. The second holding members 9b are also fixed to the roof frame members 5 as the same manner above mentioned. The fixing operation may be executed before or after loading cargoes into the container. Finally, the roof cover 5' is attached to the roof frame member 5 to cover the large opening 51, thereby to form the closed up space to house cargoes.

The dry container of about 40 feet in length is formed by achieving the above-mentioned operations, thereby to load cargoes easily loadable in the assembled container after the above-mentioned operations. On the contrary, cargo hardly loadable in the assembled container, is to load at half-way of the assemblying operations, for example only the side frame members 4 are attached to the bottom frame member 1, by using crames etc. After that, rest assembling operation should be executed.

Figure 15:
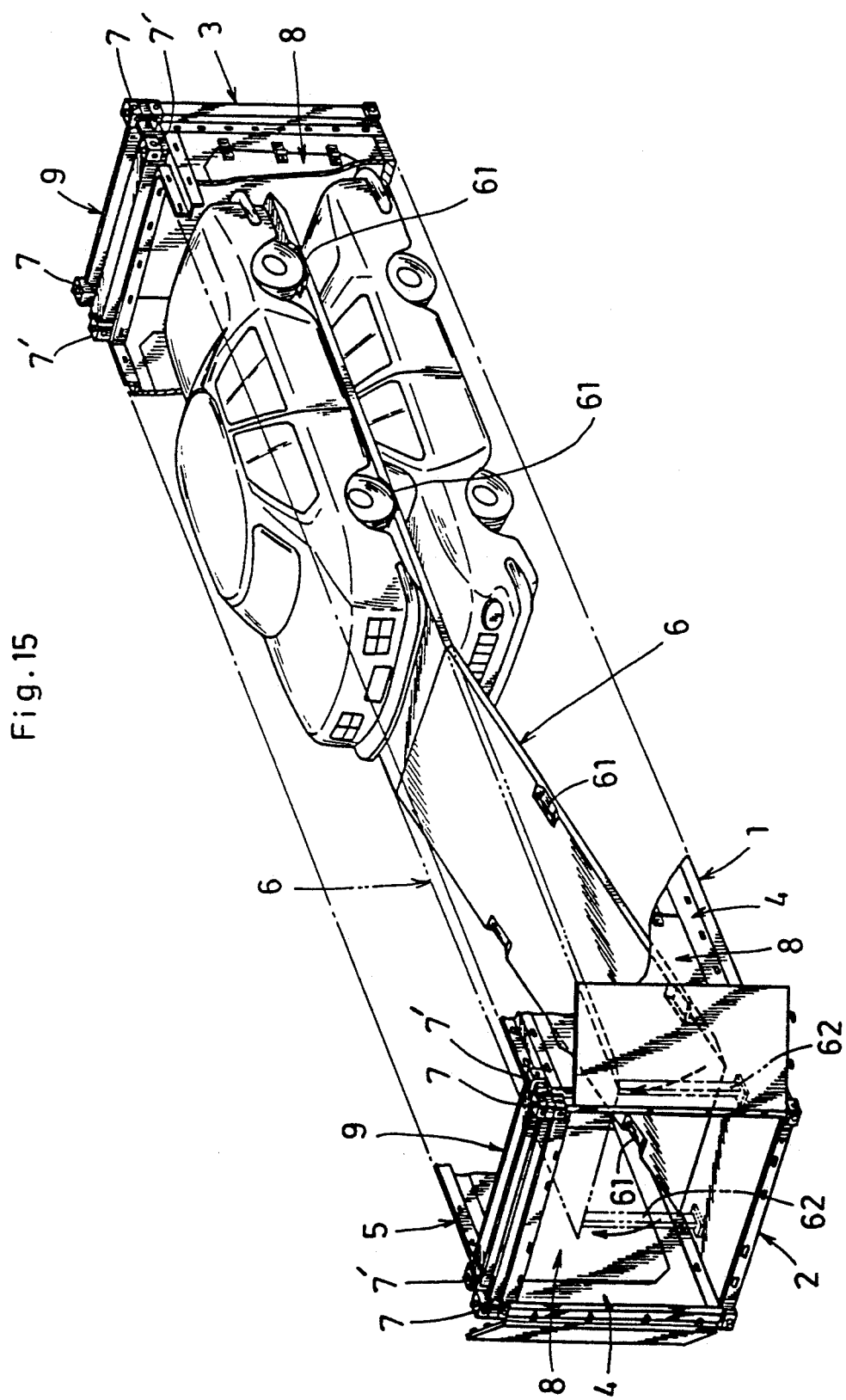
FIG. 15 is a perspective view with part of outer members taken away to show the automobiles in a loaded state.
Figure 16:
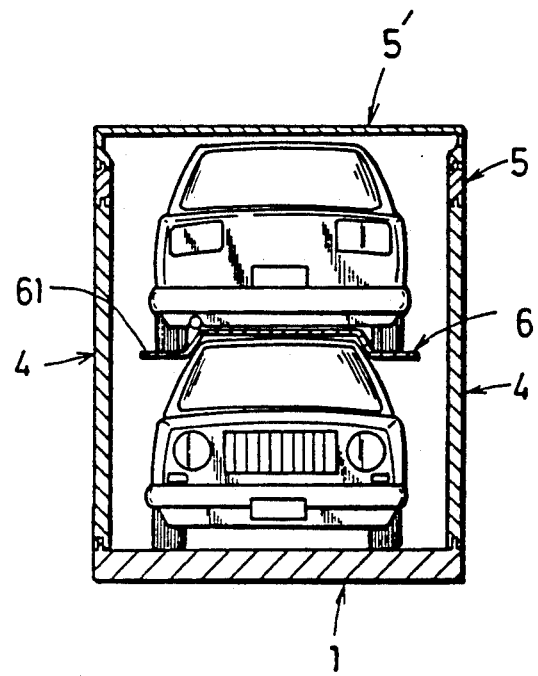
FIGS. 16 and 17 are vertical section views showing the automobiles in their loaded state.
Figure 17:
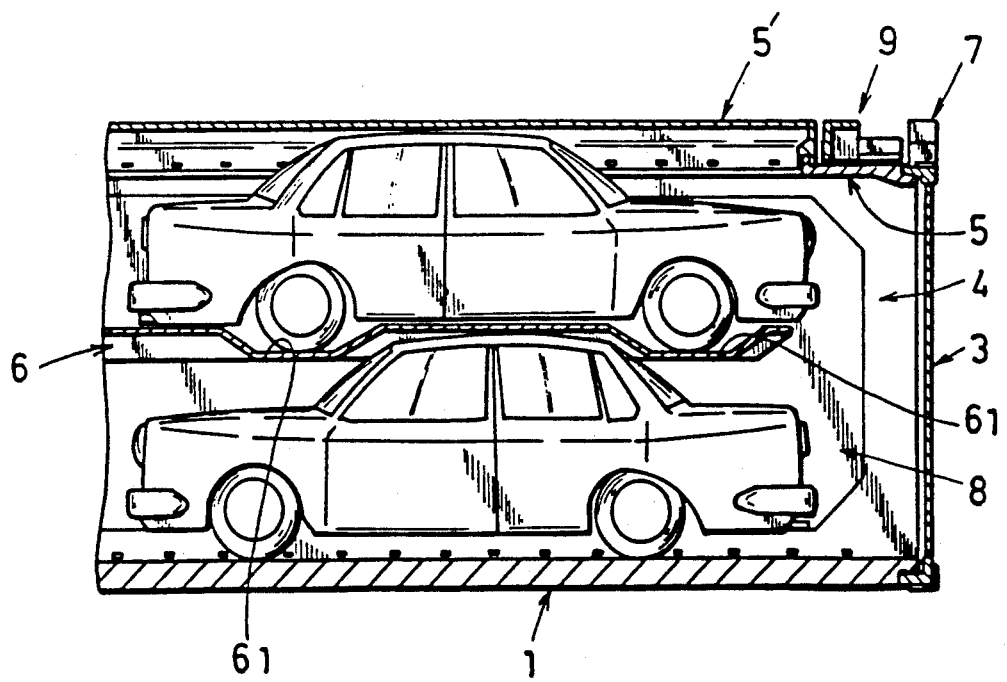
Figure 18:
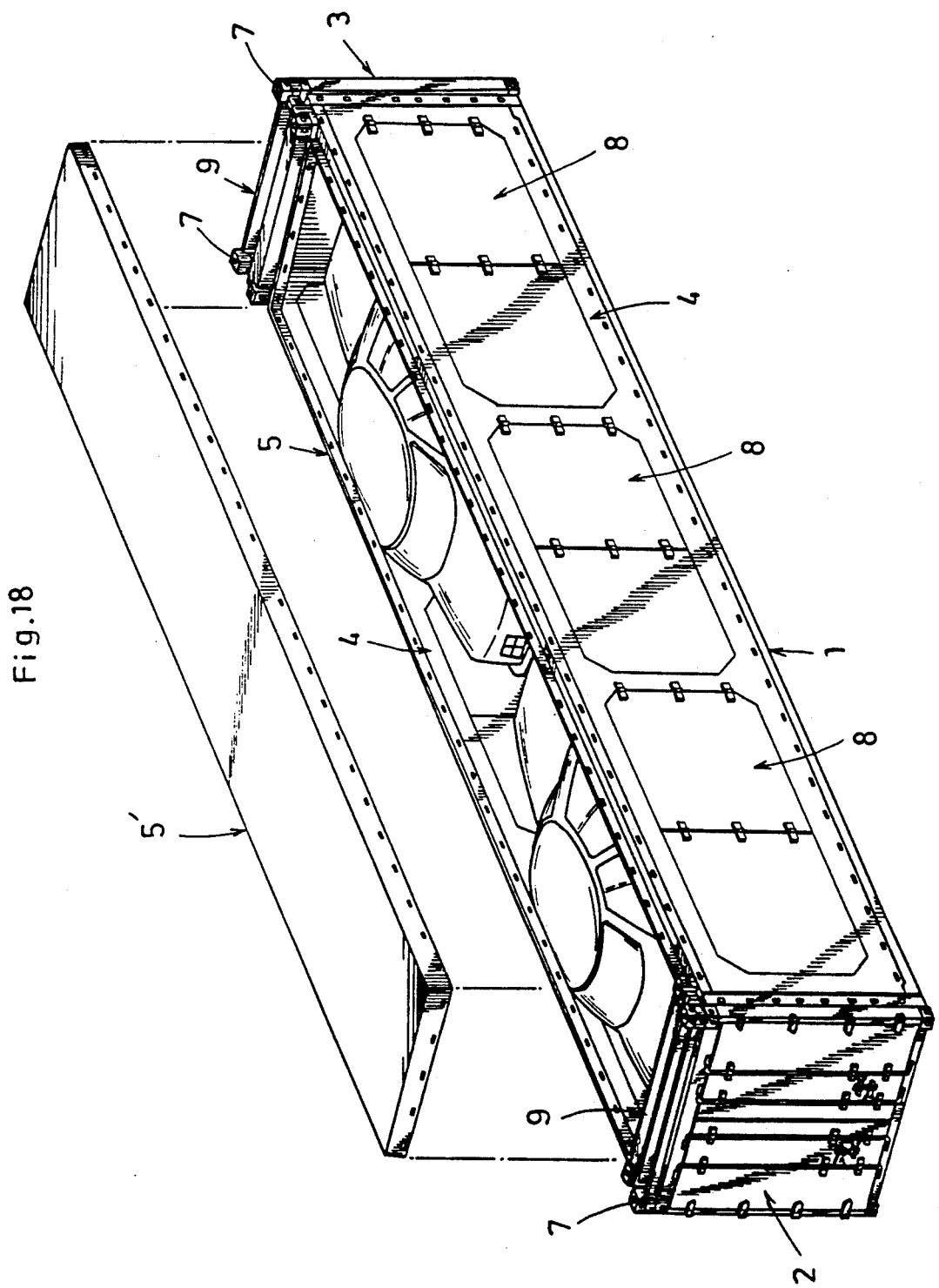
FIG. 18 is a perspective view showing the automobiles in the loaded state with the top cover being attached to the roof frame member.

Especially, when automobiles should be loaded, an automobile is loaded on the bottom frame member 1 at the state the inner shelf member 6 is moved upwardly, then an automobile is loaded on the inner shelf member 6 by driving automobiles through a sloped way at the state the inner shelf member 6 is moved downwardly closing to the roof of a loaded automobile and the sloped way is formed by rotating the short edge side portion downwardly (see FIGS. 15, 16 and 17). In the latter case, the roof cover 5' may be disattached, thereby to prevent contact of the roof cover 5' and the roof of the loaded automobile. After that, an automobile is loaded on the bottom frame member 1 at the state the short edge side portion of the inner shelf member 6 is rotated upwardly, then the short edge side portion is rotated to be parallel to the rest portion. Another automobile is loaded on the inner shelf member 6 by attaching an extra sloped way to the inner shelf member 6. Finally, the roof cover 5' is attached to the roof frame member 5 as shown in FIG. 18, thereby to complete the loading operations.

Loading automobiles on the inner shelf member 6 may be achieved by a crane through the large opening 51 of the roof frame member 5. If a driving device driven by pressured oil bearable to great load, is used, loading automobiles on the inner shelf member 6 is executed firstly, then loading automobiles on the bottom frame member 1 is executed after moving the inner shelf member 6 upwardly, and finally, moving the inner shelf member 6 downwardly and attaching the roof cover 5' to the roof frame member 5 is executed. That is, four automobiles are loaded in the container having 40 feet length, and the interior thereof is certainly kept water proofed, thereby to transport automobiles securely.

When cargoes other than automobiles are to be loaded, a bulk space for loading is obtained interior of the container by moving the inner shelf member 6 upwardly to be housed in the roof frame member 5.

When hot coils should be loaded, in the state mentioned above, hot coils are loaded in good order by using a fork-lift car etc. after opening the door member 22 of the front main frame member 2, then hot coils thus loaded are fixed at the predetermined position by fixing lashings to the fixing members 17. As a result, loading hot coils in the container having 40 feet length through door member 22, spends a great deal of labor and time. To decrease this disadvantage, hot coils should be loaded in the container through the door member 8, thereby to lessen the deal of labor and time. That is, the fork-lift car etc. runs freely at the outside of the container, and the fork-lift car etc. should be driven most carefully only when hot coils are moved from outside to inside of the container and hot coils are moved to the predetermined position in the container. When lashings are applied to the loaded hot coils, moving in/out of the operator is easily done through openings 49, thereby to remarkably decrease the danger accompanying loading, and to remarkably increase the efficiency of the lashing operation.

Accordingly, the efficiency of loading/unloading of hot coils is remarkably increased at its entirety.

The strength of the assembled multi-purpose container in the width direction is assured by the strength of both main frame members 2 and 3. The strength of the assembled multi-purpose container in the length direction is assured by the engagement of the square frames 21 and 31 of both main frame members 2 and 3 with the top edges and the steps cut away of the bottom frame member 1, side frame members 4 and roof frame member 5, and the connection of the uneven engaging portion of guiding projections with the guiding grooves using inserted wedges. The strength of the assembled multi-purpose container at its entirety is nearly the same with the conventional container satisfying the ISO standard. Preventing the sealing members from damage and preventing wind and water from entering is well accomplished.

The sequence of the assembling operations is not limited to the above-mentioned sequence, but one of the main frame members is connected to the bottom frame member 1 at the halfway of the assembling and the other main frame member is connected thereto finally are allowed.

After the wedges 10' are inserted into the communicating tapered holes, rubber plugs 10" are attached to the outerside tapered holes (see FIG. 5), thereby to prevent wind and water from intruding and to prevent wedges from slipping out.

Further more, when the height of the loaded cargo on the flat rack container is exceeded, it seems impossible to pile another container on the flat rack container. But the multi-purpose container having the construction above-mentioned, is able to be piled on the flat rack container by attaching the second holding members 9b to the bottom side of each main frame member 2 and 3 to increase the height of the connecting portion, thereby to utilize the space in holds etc. efficiently.

Loading operation of the multi-purpose container attached two pairs of holding members 9 by a crane utilizing connecting members 7 are allowed, and connecting containers to one another, fixing containers etc. are also allowed in the manner mentioned above.

Further more, positioning members (not shown) may be formed at the corresponding frame member, to be positioned easily to the connecting members attached in projected manner.

Figure 19:
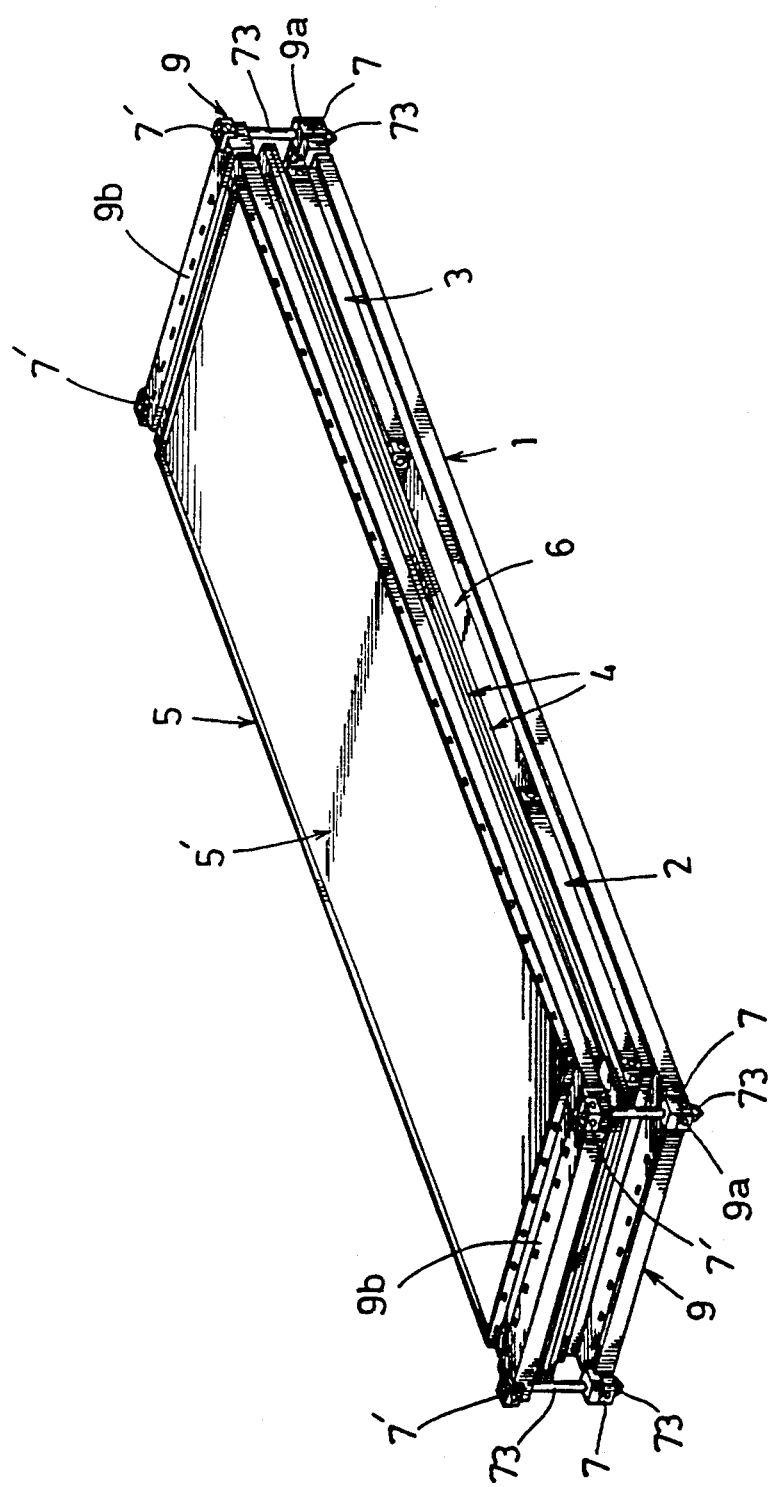
FIG. 19 is a perspective view showing the state for recovery.

When recoverinng the multi-purpose container, that is transforming the empty multi-purpose container, the multi-purpose container is disassembled into frame members by executing operations in inverse sequence to the assembling operations. Then the frame members are piled up as one body by the following operations. The inner shelf member 6 is piled on the bottom frame member 1 between the guiding projections 12, both main frame members 2 and 3 are piled on the top face of the guiding projections 12 of the bottom frame member 1, then the side frame members 4 and roof cover 5' are piled thereon, finally the roof frame member 5 is piled thereon, thereby to reduce the volume to the minimum. The contacting portion of both main frame members 2 and 3 to the guiding projections 12 have already been cut away. After that, the first connecting projections 11 are held by the first holding members 9a, and the third connecting projections 52 are held by the second holding members 9b, then the wedges 10' are inserted into the tapered holes to fix the holding members with the frame members. Finally, the main locking members fixed to one holding member are connected with the connecting members fixed to another holding member, thereby to reduce the entire volume and to be one body (see FIG. 19).

Preferably, engaging portions are formed at the contacting surface of the bottom frame member 1 and the main frame members 2 and 3 to ensure the connection of both main frame members 2 and 3. The engaging portions are positioned and have the predetermined size not to avoid the operability of assembling and disassembling and not to lessen the strength of the assembled multipurpose container. Housing the inner shelf member 6 interior of the roof frame member 5 and the roof cover 5', and housing the driving device driven by pressured oil etc. interior of the roof frame member 5 and the roof cover 5' are allowed.

Wedges 10' and rubber plugs 10" having been used to assemble the multi-purpose container, are housed interior of housing boxes (not shown) through an openable door. The housing boxes are conventional housing boxes attachable to a dry container etc., and are attached to the multi-purpose container in a surplus space. The driving device driven by pressured oil and the guiding member 62 to move the inner shelf member 6 and others are housed in the downward space of the roof cover 5', if necessary.

Accordingly, only one several-th space needed for transporting cargoes is needed when the multi-purpose container is recovered,, thereby to utilize holds, loading plat forms of trucks or freight trains, or van pool space efficiently.

The above description is made only for the multi-purpose container having 40 feet length, but the multi-purpose container having 20 feet length may also be disassembled itself, and cargoes may also be loaded and unloaded into and out from the multi-purpose container.

Figure 20:
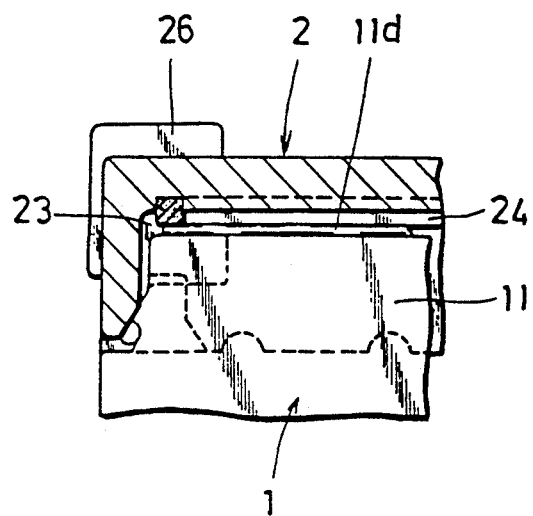
FIG. 20 is a vertical section view showing the connecting portion of the front main frame member and the bottom frame member, employing another construction.
Figure 21:
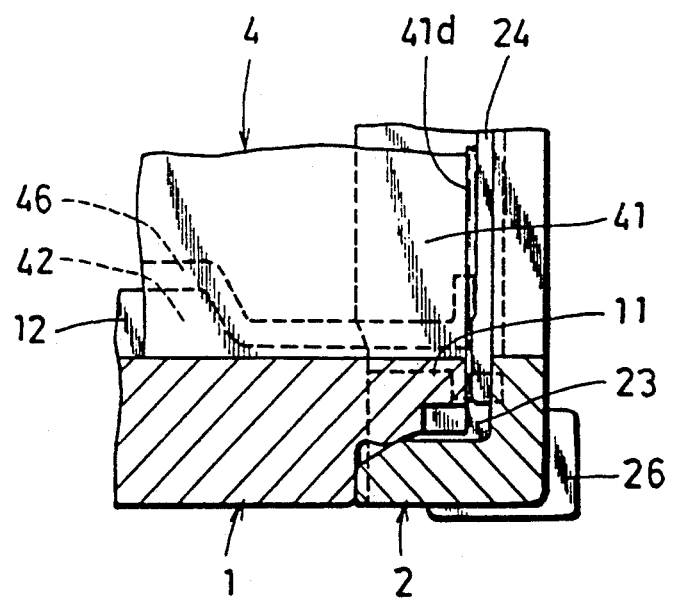
FIG. 21 is a vertical section view showing the connecting portions of the front main frame member, the bottom frame member and the side frame member, employing another construction.

The engaging part of the square frames 21 and 31 of the main frame members 2 and 3 with the bottom frame member 1, side frame members 4 and roof frame member 5 may be constructed by contacting projections to one another, or by contacting side faces to one another and contacting top and bottom uneven faces formed by cutting away, as shown in FIG. 20, thereby to connect the container body to main frame members. As a result, the demand for the strength of ISO standard is satisfied. Further, a tapered portion and a flat portion following the tapered portion may be formed at the end of the guiding projections 12 of the bottom frame member 2, as shown in FIG. 21, cone shaped projections may be formed in the surplus space, a tapered portion, a flat portion and cone shaped holes may be formed at the edge of the side frame member 4 engaged with the tapered portion, flat portion and cone shaped projections respectively, thereby to locate the side frame members 4 accurately. The engaging part of the side frame members 4 with the roof frame member 5 may be constructed as above-mentioned, thereby to locate the roof frame member 5 accurately.

Figure 22:
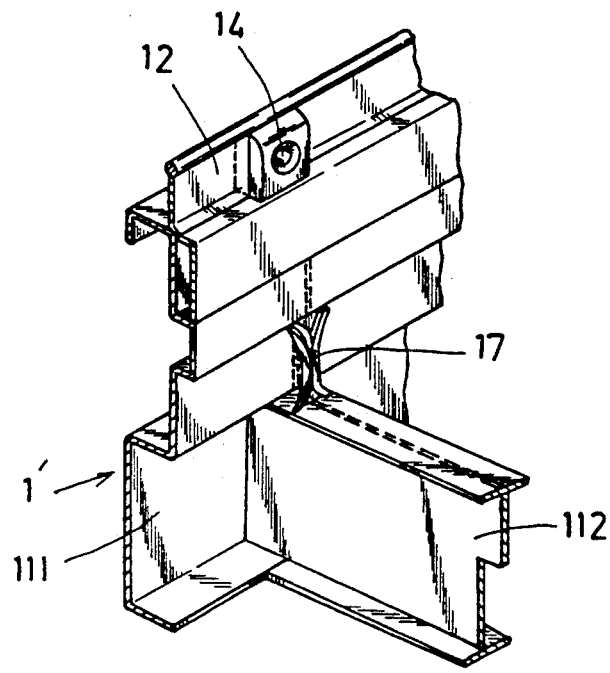
FIGS. 22 and 23 are partially cutaway perspective views of the bottom frame member, employing another construction.
Figure 23:
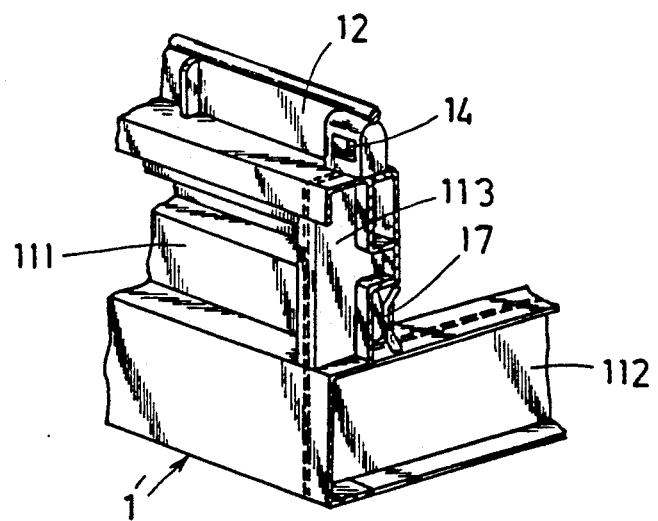

FIGS. 22 and 23 are perspective views of the main portion of the bottom frame member 1' applied to the container having 9 feet 6 inches height, having other configuration.

The height of the side frame member is kept equal to the above embodiment because every frame member should be together in a small bulk when the container is disassembled. Thereby, the difference of the height should be taken charge of by the bottom frame member 1'.

The above configuration of the bottom frame member 1' is done to satisfy the demand mentioned above.

The longer side of the bottom frame member 1' is constructed by a side plate 111 bent at the several positions thereof, thereby to obtain the bottom frame member 1' taller by 1 feet 6 inches than the bottom frame member 1 mentioned earlier. Further cross members 112 are fixed to the bottom frame member 1' at every 600 mm distance, thereby to obtain enough rigidness. A top surface plate (not shown) is further fixed to the bottom frame member 1'. Reinforcement members 113 are fixed to the predetermined position of the side plate 111, corresponding to the cross member. A fixing member 17 for fixing lashing is fixed to the predetermined position of the reinforcement member 113, as one body. A guiding projection 12 is fixed to the top edge of the side plate 111. Tapered holes 14 are formed at the predetermined position of the guiding projection 12.

Accordingly, sufficient rigidity and the increase of height corresponding to the increase of height of the multi-purpose container, of the bottom frame member 1' is obtained with little increase of the weight of the bottom frame member 1'.

This present invention is not limited to the embodiment above mentioned. Screw wedges and screw bolts etc. may be used instead of the wedges 10'. The wedge and rubber plug may be made as one body. A wedge holding member united sealing member may be attached interior of the tapered hole. The positioning of the guiding projection 12 and the guiding groove 42 may be reversed. A cut away dent may be formed instead of the guiding groove 42. The multi-purpose container may be a tall container. A pair of holding members 9 may be made as one body.

What is claimed is:

1. A multi-purpose container for holding cargo to be shipped, and being capable of being assembled into a cubic form or disassembled into a piled or stacked form, said container comprising:

a bottom frame member, side frame members, and a roof frame member which each have short edge portions at their longitudinal end portions and connection projections at said short edge portions, said connection projections defining first rectangular sleeve-like structures of said container when said bottom, said side and said roof frame members are assembled together;

main frame members for assembling with said bottom side, and roof frame members to provide longitudinal ends for said container, said main frame members each having a rectangular frame from which extends a second rectangular sleeve-like structure adapted to receive one of said first rectangular sleeve-like structures, and corner fittings mounted at each corner of said rectangular frame, said bottom frame member, said side frame members and said roof frame member each having first holes which associate with holes in another of said bottom, side and roof frame members, and having first holes in their connection projections which associate with holes in said second sleeve-like structures of said main frame members;

first screw wedges housed in one of said first holes of said bottom, sides, roof, and main frame members and movable to fit into an associated hole by first screw bolts to assemble said members together;

first back-stop screw bolts insertable in holes from an opposite side of said container to engage innermost portions of said first screw wedges;

said side frame members having openings therein which form inner flanges, said openings each having a height less than the height of said side frame members and being defined in said side members such that portions of said side members extend upwardly from upper edges of said openings and other portions of said side members extend downwardly from lower edges of said openings;

openable door members attached to said side frame members to cover said openings, said door members having holes therein which are associated with second holes in said side members;

second screw wedges housed in one of said associated holes of said door members and in said side members and movable to fit into an associated hole by second screws bolts; and second back-stop screw bolts for insertion in said associated door hole and side member holes from an opposite side of said container to engage with innermost portions of said second screw wedges; whereby when said members are assembled by said first and second screw wedges, screw bolts and back-stop screw bolts, said main frame members assure that said container has sufficient strength in the width direction, and said rectangular frames of said main frame members and said bottom frame member, said side frame member and said roof frame member and said screw wedges, screw bolts and said back-stop screw bolts assure that said container has sufficient strength in the longitudinal direction to satisfy a predetermined standard strength.

2. A multi-purpose container as set forth in claim 1, wherein said roof frame member comprises a square edge member and a detachable cover attached to said edge member to cover a top opening of said edge member.

3. A multi-purpose container as set forth in claim 1, wherein said openings are shaped as eight cornered polygons.

4. A multi-purpose container as set forth in claim 1, wherein each said inner flange is fixed along an edge portion of said opening and has an arc-shaped projection formed along an edge portion of said inner flange.

5. A multi-purpose container as set forth in claim 1, wherein said inner flange and said side frame member form a step, said door member being housed in said step and connected to said side frame member so as to open in an outward direction.

6. A multi-purpose container as set forth in claim 1, wherein said holes are provided with a sealing member.

7. A multi-purpose container as set forth in claim 1, wherein said connecting projection of each member further comprises a step.

8. A multi-purpose container as set forth in claim 7, wherein said step is provided with a sealing member.

9. A multi-purpose container as set forth in claim 1, wherein connecting portions of said bottom frame member connect with said side frame members and have a guiding projection for uniting with a locating member on said side frame members, and wherein connecting portions of said side frame members connect with said roof frame member and have guiding projection for uniting with a locating member on said roof frame member.

10. A multi-purpose container as set forth in claim 1, wherein said bottom frame member has upward projections formed along longitudinal edges of said bottom frame member and fixing members for lashing fixed to predetermined positions of said upward projections.

11. A multi-purpose container as set forth in claim 1, comprising holding members for holding said frame members in said piled form, said holding members being fixed to corner metal fittings provided at a top portion of said main frame members, said holding members being capable of being connected to one another, said holding members comprising a holding member detachably-connected to said corner metal fittings of said main frame member, and connecting members for connecting two of said holding members, said connecting members being attached to one of said holding members and capable of being housed therein.

12. A multi-purpose container as set forth in claim 11, wherein said holding members are attached to said main frame member to suit the top surface of said roof frame member.

* * * * *